(12) United States Patent
Westerink

(10) Patent No.: US 10,322,805 B2
(45) Date of Patent: Jun. 18, 2019

(54) VIDEO ARM DEPLOYMENT METHOD

(71) Applicant: Safran Seats USA LLC, Gainesville, TX (US)

(72) Inventor: Rik Westerink, The Hague (NL)

(73) Assignee: Safran Seats USA LLC, Gainesville, TX (US)

( * ) Notice: Subject to any disclaimer, the term of this patent is extended or adjusted under 35 U.S.C. 154(b) by 456 days.

(21) Appl. No.: 14/148,770

(22) Filed: Jan. 7, 2014

(65) Prior Publication Data

US 2014/0192271 A1    Jul. 10, 2014

Related U.S. Application Data

(60) Provisional application No. 61/749,527, filed on Jan. 7, 2013.

(51) Int. Cl.
*B64D 11/00* (2006.01)
*B64D 11/06* (2006.01)
(Continued)

(52) U.S. Cl.
CPC ...... *B64D 11/0015* (2013.01); *B64D 11/0624* (2014.12); *F16M 11/105* (2013.01);
(Continued)

(58) Field of Classification Search
CPC ............ B64D 11/0015; B64D 11/0624; F16M 11/105; H04N 21/41422; H04N 5/655; H04N 21/2146
See application file for complete search history.

(56) References Cited

U.S. PATENT DOCUMENTS 4,534,278 A    8/1985    Spilde
5,076,524 A    12/1991    Reh et al.
(Continued)

FOREIGN PATENT DOCUMENTS

DE    202007015886    1/2008
EP    2414235    8/2015
WO    2010117758    10/2010

OTHER PUBLICATIONS

International Patent Application No. PCT/US2010/029147, Search Report and Written Opinion dated Feb. 4, 2011.
(Continued)

*Primary Examiner* — Joseph G Ustaris
*Assistant Examiner* — Jill D Sechser
(74) *Attorney, Agent, or Firm* — Kilpatrick Townsend & Stockton LLP; Dean W. Russell; Anthony L. Guebert

(57) ABSTRACT

The present invention is generally related to video assemblies and more particularly video assemblies for on-board entertainment systems. The video assembly may include a video arm coupled with a video monitor. The video assembly may be manually moveable by a user between a stowed position and a deployed position. The video arm may include a friction torque device. The video arm may provide variable resistance depending on a direction of movement of the video assembly. In some embodiments, the video arm may provide less resistance to a user when the user moves the video assembly toward the deployed position compared to the resistance provided to a user when the user moves the video assembly away from the deployed position. Further, the video arm may provide for a low torque zone where the resistance provided to a user is reduced when the user moves the video assembly through low torque zone.

13 Claims, 1 Drawing Sheet

(51) Int. Cl.
*F16M 11/10* (2006.01)
*H04N 5/655* (2006.01)
*H04N 21/214* (2011.01)
*H04N 21/414* (2011.01)

(52) U.S. Cl.
CPC ....... *H04N 5/655* (2013.01); *H04N 21/41422* (2013.01); *H04N 21/2146* (2013.01)

(56) References Cited

U.S. PATENT DOCUMENTS

| | | | |
|---|---|---|---|
| 5,179,447 A | | 1/1993 | Lain |
| 5,374,104 A | * | 12/1994 | Moore ................. A47C 7/72 248/286.1 |
| 5,398,991 A | | 3/1995 | Smith et al. |
| 5,695,417 A | | 12/1997 | Winter et al. |
| 5,732,919 A | | 3/1998 | Rosen et al. |
| 5,996,954 A | * | 12/1999 | Rosen ................. B60R 11/0235 248/278.1 |
| 6,007,036 A | | 12/1999 | Rosen |
| 6,179,263 B1 | | 1/2001 | Rosen et al. |
| 6,288,891 B1 | | 9/2001 | Hasegawa et al. |
| 6,419,196 B1 | | 7/2002 | Sweere et al. |
| 6,453,511 B2 | | 9/2002 | Sato |
| 6,517,040 B1 | | 2/2003 | Wen |
| 6,863,344 B2 | | 3/2005 | Smallhorn |
| 7,040,699 B2 | | 5/2006 | Curran et al. |
| 7,047,600 B2 | | 5/2006 | Muir |
| 7,261,266 B2 | | 8/2007 | Satterfield |
| 7,320,652 B2 | | 1/2008 | Kilpatrick |
| 7,335,119 B2 | | 2/2008 | White |
| 7,408,596 B2 | | 8/2008 | Kunz |
| 7,537,188 B2 | | 5/2009 | Root et al. |
| 8,032,989 B2 | | 10/2011 | Liang et al. |
| 8,062,152 B2 | | 11/2011 | Nye et al. |
| 8,322,670 B2 | | 12/2012 | Westerink |
| 8,523,130 B2 | | 9/2013 | Westerink |
| 2005/0051688 A1 | * | 3/2005 | Dittmer ................. F16M 11/10 248/276.1 |
| 2006/0177298 A1 | | 8/2006 | Mueller |
| 2006/0219857 A1 | | 10/2006 | Satterfield |
| 2009/0077897 A1 | | 3/2009 | Liang et al. |
| 2010/0243839 A1 | * | 9/2010 | Westerink .......... B64D 11/0015 248/276.1 |
| 2011/0157781 A1 | | 6/2011 | Peng |
| 2011/0261273 A1 | * | 10/2011 | Weaver ............... B60R 11/0235 348/837 |
| 2013/0001389 A1 | | 1/2013 | Westerink |
| 2015/0048230 A1 | * | 2/2015 | Satterfield ............ F16M 11/121 248/278.1 |

OTHER PUBLICATIONS

International Patent Application No. PCT/US2010/029147, International Preliminary Report on Patentability dated Oct. 4, 2011.
Europe Patent Application No. 10722846.2, Communication from Examining Division dated Aug. 16, 2012.
Europe Patent Application No. 10722846.2, Reply to Communication from Examining Division dated Dec. 14, 2012.
Europe Patent Application No. 10722846.2, Intention to Grant dated Mar. 11, 2015.
U.S. Appl. No. 12/750,205, Requirement for Restriction/Election dated Feb. 13, 2012.
U.S. Appl. No. 12/750,205, Response to Requirement for Restriction/Election dated Mar. 13, 2012.
U.S. Appl. No. 12/750,205, Non-Final Rejection dated Apr. 9, 2012.
U.S. Appl. No. 12/750,205, Response to Non-Final Rejection dated Jul. 9, 2012.
U.S. Appl. No. 12/750,205, Notice of Allowance and Fees Due dated Jul. 31, 2012.
U.S. Appl. No. 13/611,051, Requirement for Restriction/Election dated Jan. 4, 2013.
U.S. Appl. No. 13/611,051, Response to Requirement for Restriction/Election dated Feb. 4, 2013.
U.S. Appl. No. 13/611,051, Non-Final Rejection dated Feb. 26, 2013.
U.S. Appl. No. 13/611,051, Response to Non-Final Rejection dated May 28, 2013.
U.S. Appl. No. 13/611,051, Notice of Allowance and Fees Due dated Jun. 14, 2013.

* cited by examiner

VIDEO ARM DEPLOYMENT METHOD

CROSS REFERENCE TO RELATED APPLICATION

This application claims priority to and the benefit of U.S. Provisional Application No. 61/749,527 filed Jan. 7, 2013, the full disclosure of which is incorporated herein by reference.

BACKGROUND OF THE INVENTION

The present invention generally relates to video assemblies and more specifically to video assemblies for stowing and deploying on-board entertainment video screens.

Video arms are used in aircraft seating to stow on-board entertainment (or in-flight entertainment) screens below the seat structure when not in use. Video arms traditionally rely on friction to control the video arm motion and to keep the video arm in the deployed position. While traditional video arms may provide sufficient video assemblies for stowing and deploying video screens, further improvements may be desirable.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some embodiments, an on-board entertainment video assembly is provided. The on-board entertainment video assembly may include a video monitor and a video arm coupled with the video monitor. The video assembly may be manually moveable by a user between a stowed position and a deployed position. The video arm may provide variable resistance to the user when the user moves the video assembly between the stowed position and the deployed position. An amount of resistance provided by the video arm may vary depending on whether the video assembly is moved toward the deployed position or away from the deployed position.

In some embodiments of an on-board entertainment video assembly, a first end of the video arm may include a hinge joint and the video monitor may be coupled with a second end of the video arm. The second end of the video arm may be opposite the first end. The video arm may rotate the video monitor about the hinge joint as a user moves the video assembly between the stowed position and the deployed position. The video assembly may be moveable to a first intermediate position between the stowed position and the deployed position and the video arm may provide a first amount of resistance as the video assembly is moved from the stowed position toward the first intermediate position. Optionally, the video arm provides a second amount of resistance once the video assembly passes the first intermediate position and is moved toward the deployed position. The first amount of resistance may be less than the second amount of resistance.

The video arm may provide resistance to the user when the user moves the video assembly from the deployed position toward the stowed position. The amount of resistance provided by the video arm may vary as the video assembly is moved from the deployed position toward the stowed position. The video assembly may be moveable to a second intermediate position between the deployed position and the stowed position. The video arm may provide a third amount of resistance as the video assembly is moved by a user from the deployed position toward the second intermediate position. Optionally, the third amount of resistance may be greater than the second amount of resistance. In some embodiments of the on-board entertainment video assembly, the first intermediate position and the second intermediate position may be the same position.

The video arm may provide a fourth amount of resistance as the video assembly passes the second intermediate position and is moved toward the stowed position. The fourth amount of resistance may be less than the third amount of resistance. In some embodiments, the fourth amount of resistance may be less than the second amount of resistance. Optionally the fourth amount of resistance is equal to the first amount of resistance. Further, in some embodiments, the fourth amount of resistance is less than the first amount of resistance.

In some embodiments of the invention, a video assembly is provided. The video assembly may include a video monitor and a video arm coupled with the video monitor. The video assembly may be manually moveable by a user between a stowed position, an intermediate position, and a deployed position. The intermediate position may be a position between the stowed position and the deployed position. The video arm may provide a first amount of resistance to the user when the user moves the video assembly from the intermediate position toward the deployed position and a second amount of resistance to the user when the user moves the video assembly from the deployed position toward the intermediate position. The first amount of resistance may be less than the second amount of resistance. In some embodiments the first amount of resistance is eighty percent of the second amount of resistance or less. In some embodiments the first amount of resistance is seventy percent, sixty percent, or fifty percent of the second amount of resistance or less. Further, the first amount of resistance may be less than or equal to thirty percent of the second amount of resistance. The second amount of resistance may be a torque value between 5-10 N·m. In some embodiments the second amount of resistance may be a torque value between 6-8 N·m.

The video arm may provide a third amount of resistance as the video assembly is moved between the stowed position and the intermediate position. The third amount of resistance may be less than the first amount of resistance and the second amount of resistance. In some embodiments the third amount of resistance is not more than twenty percent of the second amount of resistance. Optionally, the third amount of resistance is not more than fifteen percent of the second amount of resistance.

The video arm may provide a third amount of resistance as the video assembly is moved from the stowed position towards the intermediate position. The video arm may provide a fourth amount of resistance as the video assembly is moved from the intermediate position towards the stowed position. The third amount of resistance may be different than the fourth amount of resistance.

In some embodiments, the intermediate position may be a position between 15-45° from the stowed position. Optionally, the intermediate position may be a position between 25-35° from the stowed position.

In some embodiments, a video assembly is provided. The video assembly may include a video monitor and a video arm coupled with the video monitor. The video assembly may be manually moveable by a user between a stowed position and a deployed position. The rotation of the video assembly between the stowed position and the deployed position may include a low torque zone and a directional torque zone. The video arm may provide a reduced resistance to the user when the user moves the video assembly in the low torque zone. Additionally, the video arm may provide a first resistance to the user when the user moves the video assembly in a first direction in the directional torque zone and a second resistance to the user when the user moves the video assembly in a second direction in the directional torque zone—the second direction being opposite the first direction. The second resistance may be greater than the first resistance and the first resistance may be greater than the reduced resistance.

In some embodiments, the first direction may be a deploying direction and the second direction may be a stowing direction. Optionally, the low torque zone may be a zone extending 25-35° from the stowed position. The first resistance may be less than or equal to fifty percent of the second resistance. The reduced resistance may be less than or equal to fifteen percent of the second resistance.

The invention will be better understood on reading the following description and examining the figures that accompany it. These figures are provided by way of illustration only and are in no way limiting on the invention.

DETAILED DESCRIPTION OF THE DRAWINGS

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Some embodiments of the invention are related to a video arm deployment method allowing for variable resistance in force required to operate at different angles of deployment and direction. Traditional video arms have consistent resistance which means the video arm may be difficult to deploy for the passenger as the resistance may be set to prevent the arm from free falling when the arm is deployed. Control of the friction or resistance provided by the video assembly may create more flexibility. In some embodiments, the invention may allow for both easy stowage/deployment using low resistance through a low resistance zone or low torque zone close to the stowed position and allows for a lower resistance when deploying the video assembly to the deployed position compared to a resistance when stowing the video assembly to the stowed position.

Figure 1:
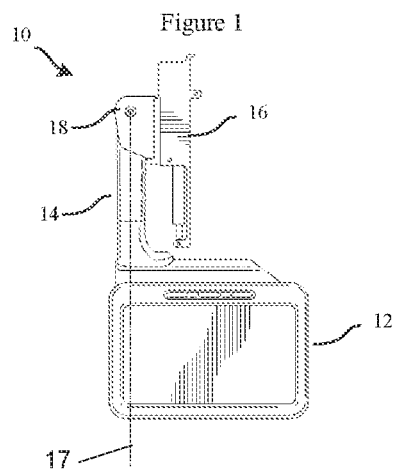
FIG. 1 shows an exemplary video assembly in a stowed position according to some embodiments of the invention.
Figure 2:
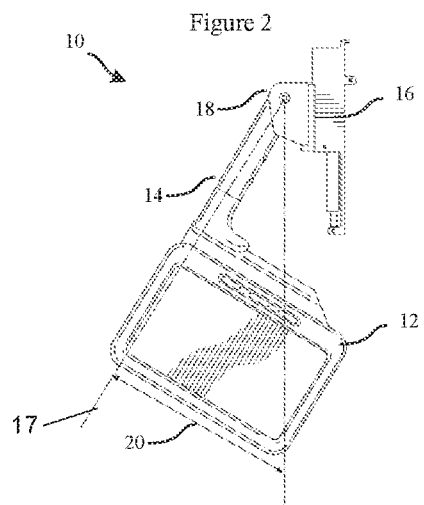
FIG. 2 shows the exemplary video assembly of FIG. 1 in an intermediate position according to some embodiments of the invention.
Figure 3:
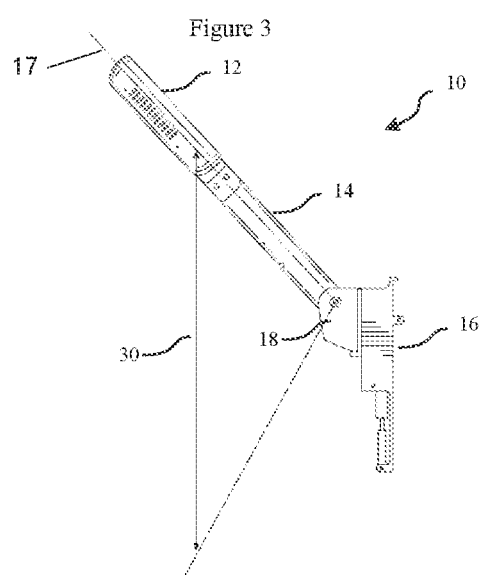
FIG. 3 shows the exemplary video assembly of FIG. 1 and FIG. 2 in a deployed position according to some embodiments of the invention.

FIGS. 1-3 show an exemplary video assembly 10 that is moveable by a user between a stowed position, as shown in FIG. 1, and a deployed position, as shown in FIG. 3. The video assembly 10 may include a video monitor 12, a video arm 14, and a mount 16. The video monitor 12 may be coupled to an end of the video arm 14. The opposite end of video arm 14 may be coupled with mount 16. Video monitor 12 may be rotatably coupled relative to video arm 14 such that video monitor 12 can rotate about an axis 17 of video arm 14. Video arm 14 may include a hinge joint 18 for coupling with mount 16. The hinge joint 18 may provide variable resistance to a user as the user moves the video assembly 10 between the stowed position and the deployed position. Further, the hinge joint 18 may be configured to provide different amounts of resistance to a user depending on a direction of movement of the video assembly 10 as will be discussed further below.

In some embodiments, the video assembly 10 may be part of an on-board entertainment system for a passenger vehicle, for example. Accordingly, mount 16 may be coupled with a passenger seat, on a wall adjacent to a passenger seat, a passenger seat armrest, or any other place that is easily accessible by a passenger. Optionally, the video assembly 10 may be used in passenger cars, passenger vans or buses. Further, some embodiments may be used in passenger aircraft, trains, and/or boats.

In the embodiments shown in FIGS. 1-3, the hinge joint 18 may be a friction hinge, which relies on a constant friction force within the hinge joint 18 to hold its position throughout the full range of motion. In these embodiments, the hinge joint 18 is mounted with a horizontal axis of rotation. As discussed above, the resistance during user movement of the video assembly 10 may depend on a direction of the video assembly 10 movement. The range of motion where resistance depends on a direction of movement may be referred to as a directional torque zone or directional resistance zone 30. For example, in some embodiments, a resistance provided by the video assembly 10 when the user moves the video assembly 10 toward the deployed position may be different than the resistance provided by the video assembly 10 during user movement of the video assembly 10 away from the deployed position. In some embodiments, it may be preferable to require more force to move the video assembly 10 away from the deployed position than to move the video assembly 10 toward the deployed position. In other words, a resistance during video assembly 10 movement toward the deployed position may be less than a resistance during the video assembly 10 movement away from the deployed position. This configuration may provide a user with a video assembly 10 that is easier to move toward the deployed position and may prevent the video assembly 10 from free falling once deployed. Further, the increased resistance during stowing may allow for the video arm 14 to be slowly lowered by a user without the risk of free falling and potential injury to the passenger.

In some embodiments, the torque resistance provided by the video assembly 10 during movement away from the deployed position may be a maximum resistance provided by the video assembly 10. The maximum resistance may be a value between 5-10 N·m. In some embodiments, the torque resistance during movement away from the deployed position may be a value between 6-8 N·m, and may preferably be approximately 7 N·m or less in some examples. The torque resistance provided by the video assembly 10 during user movement of the video assembly 10 toward the deployed position may be seventy percent of the maximum resistance, sixty percent of the maximum resistance, fifty percent of the maximum resistance, or less. In some embodiments, the torque resistance provided by the video assembly 10 during user movement of the video assembly 10 toward the deployed position may be a value between 2.5-5 N·m in some embodiments. In some embodiments, the torque resistance provided by the video assembly 10 during movement toward the deployed position may be a value between 3-4 N·m or may be approximately 3.5 N·m or less in some embodiments. Accordingly, in some embodiments, the video assembly may provide more resistance during user movement of the video assembly 10 away from the deployed position than during user movement of the video assembly 10 toward the deployed position.

In further embodiments, a low resistance or low torque zone 20 may be provided by the video assembly 10. A low resistance or low torque zone 20 comprising a portion of the rotation of the video arm 14 between the stowed position to an intermediate position may allow for easy stowage and deployment requiring minimal effort from the seat occupant. The low torque zone 20 may also allow for a kick-out assist feature to operate with a minimal force. The amount of resistance provided by the video assembly 10 as a user moves the video assembly 10 through a low torque or low resistance zone 20 may be less than the amount of resistance provided to a user when the user moves the video assembly 10 toward the deployed position. FIG. 2 shows the exemplary video assembly 10 in an intermediate position according to some embodiments of the invention. Thus, video assembly 10 may provide a reduced resistance as a user moves the video assembly 10 in between the stowed position and the intermediate position. The reduced resistance may be thirty percent of the maximum resistance, twenty percent of the maximum resistance, or fifteen percent of the maximum resistance, or less in some embodiments. For example, the reduced resistance may be a value between 0.75-1.5 N·m. In some embodiments the reduced resistance provided in the low torque zone 20 may be a value between 0.9-1.2 N·m and may preferably be approximately 1.05 N·m or less.

While illustrated as approximately thirty degrees from the stowed position, a person of ordinary skill will understand that the intermediate position may be any position between the stowed position illustrated in FIG. 1 and the deployed position illustrated in FIG. 3. In some embodiments the intermediate position may be ninety degrees about hinge joint 18 from the stowed position or less. In some embodiments, the intermediate position is seventy-five degrees, sixty degrees, forty-five degrees, thirty degrees, or twenty degrees about hinge joint 18 from the stowed position. Accordingly, in some embodiments, the low torque zone or the low resistance zone 20 may be extend anywhere from twenty to ninety degrees from the stowed position.

In some embodiments, the video arm 14 may provide differing amounts of resistance to a user as the user moves the video assembly 10 in a low torque zone 20 depending on the direction of movement. Accordingly the low torque zone or low resistance zone 20 may also be a directional torque/resistance zone. In some embodiments, video arm 14 may provide a greater resistance when the user moves the video assembly 10 in a stowing direction in the low resistance zone 20 than when the user moves the video assembly 10 in a deploying direction in the low resistance zone 20. In other embodiments, video arm 14 may provide a greater resistance when the user moves the video assembly 10 in a deploying direction in the low resistance zone than when the user moves the video assembly 10 in a stowing direction in the low resistance zone.

Additionally, in some embodiments, the video assembly 10 may have a larger low torque zone 20 when the user moves the video assembly 10 toward the stowed position compared to a low torque zone 20 when the user moves the video assembly 10 away from the stowed position. For example, in some embodiments, the low resistance zone 20 while a user moves the video assembly toward the stowed position may comprise a portion of the rotation of the video arm between an intermediate position of about forty degrees, for example, to the stowed position. The low resistance zone 20 while a user moves the video assembly away from the stowed position may comprise a portion of the rotation of the video arm between the stowed position and an intermediate position of about thirty degrees, for example.

In other embodiments, the video assembly 10 may have a larger low torque zone 20 when the user moves the video assembly 10 away from the stowed position compared to a low torque zone 20 when the user moves the video assembly 10 toward the stowed position. For example, in some embodiments, the low torque zone 20 while a user moves the video assembly away from the stowed position may comprise a portion of the rotation of the video arm between the stowed position to an intermediate position of about thirty degrees, for example. The low torque zone 20 while a user moves the video assembly toward the stowed position may comprise a portion of the rotation of the video arm between an intermediate position of about forty degrees, for example, to the stowed position. Optionally, the low torque zones 20 may be approximately equal in some embodiments.

Further, in some embodiments, multiple zones may be provided that provide differing amounts of resistance. For example, in some embodiments three, four, or five or more zones may be provided where the amount of resistance provided by the video assembly 10 differs as the user moves the video assembly 10 through the zones.

One of ordinary skill in the relevant art will understand that any suitable torque resistance may be used that provides sufficient torque to overcome the torque generated by all the forces acting on the video assembly 10, so that the hinge joint 18 may hold the video assembly 10 in position with no external load, while still allowing a suitable range of external force to be applied to overcome the hinge torque and move the video assembly 10 into another position within its range of motion.

In other embodiments, the hinge joint 18 may be a detent hinge, which provides for repeatable soft stops in one or more positions over the entire range of motion. In yet other embodiments, the hinge joint 18 may be a standard hinge that is combined with a positioning lock that is engaged when the video assembly 10 reaches the desired location.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. An on-board entertainment video assembly comprising:
a video monitor;
a video arm comprising a first end and a second end, the second end coupled with the video monitor; and
a mount, wherein the first end of the video arm is pivotally coupled to the mount,
wherein the video assembly is manually moveable by a user between a stowed position and a deployed position, wherein movement of the video assembly toward the deployed position is a deployment movement and movement of the video assembly toward the stowed position is a stowing movement,
wherein the video arm provides a first resistance to the user during the deployment movement from the stowed position toward an intermediate position, a second resistance to the user during the deployment movement from the intermediate position toward the deployed position, a third resistance to the user during the stowing movement from the deployed position toward the intermediate position, and a fourth resistance to the user during the stowing movement from the intermediate position to the stowed position,
wherein the third resistance is greater than the first resistance, wherein the third resistance is less than the second resistance, and wherein the fourth resistance is greater than the first resistance.

2. The on-board entertainment video assembly of claim 1, wherein the first end of the video arm comprises a hinge joint, and wherein the video arm rotates the video monitor about the hinge joint as the video assembly is moved between the stowed position and the deployed position.

3. The on-board entertainment video assembly of claim 1, wherein the first resistance is less than the second resistance.

4. The on-board entertainment video assembly of claim 1, wherein the third resistance is greater than the fourth resistance.

5. The on-board entertainment video assembly of claim 4, wherein the fourth resistance is less than the second resistance.

6. A video assembly comprising:
a video monitor;
a video arm comprising a first end and a second end, the second end coupled with the video monitor; and
a mount, wherein the first end of the video arm is pivotally coupled to the mount;
wherein the video assembly is manually moveable by a user between a stowed position, an intermediate position, and a deployed position, the intermediate position being between the stowed position and the deployed position;
wherein movement of the video assembly toward the deployed position is a deployment movement and movement of the video assembly toward the stowed position is a stowing movement,
wherein the video arm provides a first resistance to the user during the deployment movement from the stowed position toward the intermediate position, a second resistance to the user during the stowing movement from the deployed position toward the intermediate position, and a third resistance to the user during the stowing movement from the intermediate position to the stowed position, and
wherein the first resistance during the deployment movement is less than the second resistance during the stowing movement, wherein the first resistance during the deployment movement is less than the third resistance during the stowing movement, and wherein the third resistance is less than the second resistance.

7. The video assembly of claim 6, wherein the first resistance is less than or equal to fifty percent of the second resistance.

8. The video assembly of claim 6, wherein the video arm provides a fourth resistance as the video assembly is moved between the intermediate position and the deployed position.

9. The video assembly of claim 8, wherein the fourth resistance is not more than fifteen percent of the second resistance.

10. The video assembly of claim 6, wherein the intermediate position is between 15-45° from the stowed position.

11. The video assembly of claim 10, wherein the intermediate position is between 25-35° from the stowed position.

12. A video assembly comprising:
a video monitor;
a video arm comprising a first end coupled with the video monitor;
a mount, wherein a second end of the video arm is pivotally coupled to the mount;
wherein the video assembly is manually moveable by a user between a stowed position and a deployed position, a video arm range of motion between the stowed position and the deployed position including a low torque zone between the stowed position and an intermediate position and a directional torque zone between the intermediate position and the deployed position;
wherein the video arm provides a first reduced resistance to the user when the user moves the video assembly in the low torque zone from the stowed position to the intermediate position and a second reduced resistance to the user when the user moves the video assembly in the low torque zone from the intermediate position to the stowed position; and
wherein the video arm provides a first directional resistance to the user when the user moves the video assembly in in the directional torque zone from the intermediate position to the deployed position and a second directional resistance to the user when the user moves the video assembly in the directional torque zone from the deployed position to the intermediate position,
wherein the second directional resistance is greater than the first directional resistance, wherein the second directional resistance is greater than the second reduced resistance, and wherein the second reduced resistance is greater than the first reduced resistance.

13. The video assembly of claim 12, wherein the low torque zone comprises a range of 25–35° from the stowed position, and wherein the first directional resistance is less than or equal to fifty percent of the second directional resistance and wherein the second reduced resistance is less than or equal to fifteen percent of the second directional resistance.

* * * * *